Patented Sept. 29, 1942

2,296,948

UNITED STATES PATENT OFFICE 2,296,948

PLASTICS MANUFACTURE

Earle C. Pitman, Lincroft, N. J., assignor to E. I. du Pont de Nemours & Company, Wilmington, Del., a corporation of Delaware No Drawing. Application December 16, 1937, Serial No. 180,134

8 Claims. (Cl. 18—48)

This invention relates to a process for bonding together particles of comminuted material such as granular cork coated with an organic adhesive by means of a high frequency electrical field.

Heretofore, it has been common practice to bind granular material such as cork, wood flour, asbestos, and the like by mixing these particles with a suitable binding agent and subsequently subjecting the material to heat and pressure to form a sheet of the material. It has also been common practice to pass the coated granular material through a tube heated externally by steam in a jacket or other device in order to produce a cylindrical mass of the granular material. In this modification, especially where cork is used, slices of the cylindrical mass are cut off and the discs are then used for gaskets, particularly in crimped bottle caps.

This method has certain limitations first of which is that when heat is applied externally, a relatively long time is necessary for it to be conducted to the center of the mass and consequently the outside is heated to a higher degree than the inside which results in a lack of uniformity in the finished product. This is particularly true where resin binders are used which are of the heat setting type; that is, those which react chemically while being heated to form a permanent resinous product. The only method of avoiding this difficulty heretofore has been to place the tubes in an oven or other heating chamber for a relatively long period of time. This results in a great increase in the space and equipment necessary to produce sufficient products on a commercial basis.

This invention has as an object the provision of a method of bonding granular materials together by means of a resin or other thermoplastic material in which the entire mass is heated uniformly throughout its cross section in a very short time.

Another object is the provision of a method by which great uniformity of heat is applied to the individual particles.

Another object is the elimination of furnaces and heating chambers which have heretofore been necessary for uniform heating.

A still further object is the provision of a continuous method which permits a greater variety of adhesives to be used in an exceptionally expeditious manner.

Other objects will appear as the description of the invention proceeds.

These objects are accomplished by coating granular material such as cork, wood flour, and like thermally and electrically substantially non-conducting materials with an adhesive material and subsequently subjecting the mass to heat and pressure. The heat is furnished by placing the mass in a suitable insulating container in an energized field created through the agency of a high frequency electrical current.

In practicing the present invention, the cork or other comminuted inert and preferably infusible material may be thoroughly mixed with an organic adhesive agent in dry powdered form or dissolved or dispersed in a suitable amount of an appropriate solvent. The organic adhesive may also comprise a synthetic resinous product in its fluid monomeric or early stage of condensation with which the inert filler may be mixed without the inclusion of liquid solvents. It is desirable to coat or intimately and uniformly associate the granules thoroughly with the adhesive and it has been found that a Werner & Pfleiderer type kneading machine is very satisfactory for this purpose. Following this operation, the mixture may be spread on a tray and allowed to partially dry at room temperature. The material is then placed in a suitable container depending upon the nature of the finished product desired. If a cylindrical mass from which discs may be cut is desired, the mixture of cork and adhesive material is placed in a tube and packed to the desired density. The tube is provided with caps at each end and these are put in place, and the tube is then placed in a high frequency energized field. It is important to avoid the use of metal in the tube or in its caps or means to hold the caps in place.

The following examples are given by way of illustration although it will be apparent that the invention is not limited to these examples since modifications falling within the scope of the invention will be readily apparent:

*Example 1*

| | Per cent by weight |
|---|---|
| Granular cork | 55.2 |
| Urea-formaldehyde resin* | 24.4 |
| Iso-butyl alcohol | 13.3 |
| Xylol | 6.8 |
| Phosphoric acid (85%) | .3 |
| | 100.0 |

*The urea-formaldehyde resin in this example was prepared by heating urea and formaldehyde together with or without a catalyst by methods well known in the art until an intermediate condensation product is formed. This intermediate in a suitable vehicle may be applied to the cork and further polymerization takes place in the tube when heated by means of the high frequency energized field as described above. A particularly suitable process for preparing this resin is described in copending application of Edgar & Robinson, Serial No. 58,000, filed January 7, 1936, now Patent No. 2,191,957.

The ingredients given in the above example were thoroughly mixed and the resulting mass spread out and permitted to dry at room temperature for approximately 16 hours. The cork coated with the resin was then compressed in a suitable porous non-conducting tube. The tube actually used in this example was made of "Isolantite" obtainable from the Isolantite Corp., Belleville, N. J. It is prepared from a high temperature ceramic talc composition.

Other types of porous tubes such as those fabricated from an "Alundum" are also suitable. If the ceramic material is not sufficiently porous to allow gases which may be generated to escape, it may be necessary to provide fine holes in the tube. It has been found that it is advantageous to provide holes which form an acute angle with the material as it approaches the hole when material is forced through the tube continuously.

In the present example, the cork was compressed in the tube to a density of about 13 lbs. per cubic ft.; that is, a cubic ft. of the cork coated with resin when compressed would weigh about 13 lbs. The tube was then provided with end caps of material similar to that from which the tube was made. The tube was then placed between two suitable metal plates which were in turn attached conductively to a source of high frequency electrical current. The electrical energy was applied continuously at an input of 480 watts at 2100 volts, and a frequency of 30 megacycles for a period of 5 minutes. After cooling the tubes, the end caps were removed and the charge pushed through the tube. It came out in the form of a rod from which thin circular discs could be readily sliced and used for bottle cap inserts.

When the process is conducted continuously, the cork coated with resin may be forced by means of a rotating worm or other device through a ceramic tube which lies in a high frequency electrical field.

*Example 2*

| | Per cent by weight |
|---|---|
| Granular cork | 40.5 |
| N-propyl methacrylate resin* | 17.9 |
| Ethyl acetate | 41.6 |
| | 100.0 |

*This resin was used in the polymeric form. The preparation of monomeric methyl methacrylate is described in the copending application of D. J. Loder, Serial No. 593,411. The polymerization of the ester is effected by methods known in the art as for example treatment of the monomer with light, heat, and catalysts such as organic peroxides.

The propyl methacrylate resin polymer was dissolved in the ethyl acetate solvent. The comminuted cork was thoroughly mixed with the resin solution, after which the resulting mixture was placed in an open tray and allowed to dry at room temperature for ½ hour. The resin-coated cork granules were compressed in a perforated Isolantite tube capped at both ends, to a density of about 13 lbs. per cubic ft. The tube was placed between suitable metal plates attached to a source of high frequency electrical current. Electrical energy was applied continuously at an input of 525 watts, 2,100 volts, 30 megacycles for a period of 2 minutes. After cooling the tube was opened by removing the end caps, and the bonded cork discharged in the form of a rod which may be cut into thin circular discs suitable for bottle cap inserts.

*Example 3*

| | Per cent by weight |
|---|---|
| Granular cork | 47.5 |
| Phenol-formaldehyde resin* | 21.0 |
| Diethylene glycol | 31.5 |
| | 100.0 |

*A reaction product of phenol and formaldehyde in diethylene glycol by methods well known in the art. This resin was utilized in an intermediate stage and was later polymerized during the heat treatment of the material in the tube.

The granular cork in the above example was mixed thoroughly with the resin composition. The resin-coated cork granules were compressed in a "Pyrex" glass tube to a density of about 13 lbs. per cubic ft. The tube was placed between suitable metal plates attached to a source of high frequency electrical current. Electrical energy was applied at an input of 900 watts, 2,000 volts, 30 megacycles, intermittently during four 15 second periods. After cooling, the caps were removed from the tube, and the bonded cork extruded in the form of a rod.

In all of the above examples the values of electrical energy given refer to the input to the apparatus producing the high frequency.

Heat convertible organic adhesive materials as illustrated by Example 3 (that is, those materials such as synthetic resins which are employed in their unpolymerized state and which become polymerized to a substantially infusible and insoluble state through the application of heat) are generally applicable in operating the present invention. In addition to the phenol-aldehyde resins, other resins such as urea-aldehyde resins, vinyl resins, acrylic acid resins, "ether" resins such as disclosed in a co-pending application to Arvin Serial No. 651,635, etc., are likewise operable with proper adjustment of variable operating factors. Under suitable operating conditions the monomeric form of certain classes of resins, such as acrylic acid resin monomers are also operable. Organic adhesive materials which develop adhesive properties through heating mainly by virtue of their thermoplasticity and which develop a bond on cooling as illustrated by Examples 1 and 2 and the types of compositions disclosed in U. S. Patent No. 2,064,802.

Synthetic resins in addition to those described in Examples 1 and 2 such as phenol-aldehyde resins, vinyl resins, "ether" resins (for example, a reaction product of dichlorodiethyl ether and diphenylol 3,5 dimethyl cyclohexane) such as described in a co-pending application to Arvin, Serial No. 651,635, when used in their polymerized or semi-polymerized state, that is, when they have not become completely infusible, may also be employed in the new process. Organic adhesive materials which develop bonding properties through evaporation of volatile solvents such as the conventional cellulose derivative cements are also suitable in the operation of the present invention which is, therefore, applicable to a wide range of thermally and electrically substantially non-conducting organic adhesive materials.

In cases where there is a tendency for the mass to stick to the walls of the tube, such tendencies may be reduced or eliminated by the inclusion of a small proportion of a wax or wax-like material or an oil such as a mineral oil thereby permitting better movement through the tube when the process is utilized in its continuous form and greater ease of extruding the mass from the tube if the process is operating on an intermittent batch method.

The pressure utilized in the process when the material is treated in or extruded through a tube may vary over a wide range depending upon the composition of the mass being treated and the required density of the final product, since this physical characteristic will be governed by the ultimate use of the final product, for instance, bottle cap inserts would require preferably a more dense product than a similar composition that would be more adapted for heat insulation purposes such as in refrigerator construction.

It is not intended to limit the invention to the particular set of operation conditions described above since these factors may be varied over a considerable range depending upon the particular type of adhesive used, the composition of the filler employed, the time period for which the electrical energy is applied, the distance between the condenser plates, the temperature required to convert or fuse the adhesive or drive off volatile solvents, the size and shape of the extrusion tube, etc., but it is believed that these variables (electrical input, frequency, etc.) can be readily determined for any specific utility by simple and obvious adjustment as indicated by the foregoing description.

The frequency of the current required to produce an electrical energized field necessary to heat treat the plastic mass may properly vary within comparatively wide limits. This is necessarily so since the hysteresis characteristics of the various organic adhesive materials used may vary considerably. In general, suitable results may be obtained when the electrical energy is applied between 100,000 cycles per second and 100 megacycles per second. It is impossible to state what the optimum frequency conditions are for each adhesive because of the varying electrical and chemical characteristics of the different adhesive materials. However, the optimum frequency can easily be determined by testing a few values in the above range and to those familiar with high frequency electrical equipment, this can readily be done.

In the examples, the non-conducting tube containing the plastic mass is placed between suitable condenser plates to which high frequency electric current is applied to cause the adhesive to bond the granular cork particles. Alternatively similar results may be secured by placing the tube containing the plastic mass in an electrically energized field as produced by a spiral electrically conducting coil (which may also be hollow and cooled during the process by passing water through it) attached to a source of high frequency electric current. Although in this case the plastic mass is inductively heated by an electromagnetic field the results are similar. The electrostatic field as produced from condenser plates attached to a suitable source of high frequency electric current may be conveniently employed for heating electrostatically a plastic mass in the form of a sheet. This process may be made continuous by placing the sheeted plastic mass on a non-conducting moving belt which may be caused to pass between the condenser plates at a controlled rate of speed. The alternative process based on the use of a non-conducting tube may likewise be made continuous by continuously extruding the plastic mass at a controlled rate through the tube while subjecting it to an energized electromagnetic or electrostatic field produced from a conducting coil or condenser plates attached to a source of high frequency electric current.

The process herein described is applicable to heat converting, activating of or bonding by suitable adhesives of a variety of inert substances other than granular cork. Other comminuted or finely divided materials such as wood flour, asbestos, pigments or miscellaneous fillers may be used effectively.

The invention finds particular adaptability in the manufacture of bonded cork products in the form of rods, tubes and sheets for use as liners of crown caps, expansion joints in concrete structures, insulating media in the refrigeration field, etc. The product can be laminated with other materials such as metallic foil, wood, wallboard, asbestos, etc. The invention is generally useful for processes involving the molding extrusion of tubes and rods for such substantially non-conducting plastics as celluloid and other cellulose derivative plastics, synthetic resins, etc.

A particular commercial advantage of employing high frequency current according to this invention is the great increase in speed of operation as compared to the application of external heat in the conventional manner, so that a considerable saving in time, labor and equipment is effected.

This new process is particularly useful in the production of relatively thick masses by generating heat in the interior and throughout the main body of the mass simultaneously, especially where the filler is a thermally and electrically substantially non-conducting material and where it is impractical to apply at very high surface temperature without causing decomposition and resultant injury of the plastic being manufactured.

The process is characterized by more accurate control as compared with that required by conventional methods, since the heat generated in the adhesive is directly dependent upon electrical effects which are capable of fine adjustment by suitable electrical control devices.

This invention permits the use of desirable adhesive materials not ordinarily useful when operating technique heretofore available is applied, such as a type which requires a substantially high temperature for a brief period of time for its conversion. Furthermore, the application of high temperatures over relatively short time periods when such are required, greatly reduces the possibility of injury by decomposition to the article being prepared.

Heat convertible adhesives are uniformly converted by the new process and this provides a uniformly strong bond which insures a product less likely to fail in service or to be rejected on final inspection during manufacture because of inadequate cementing of the filler particles.

It is apparent that many widely different embodiments of this invention may be made without departing from the spirit and scope thereof; and, therefore, it is not intended to be limited except as indicated in the appended claims.

I claim:

1. A process for the manufacture of organic plastic sheets which comprises mixing cork granules with an organic binder in the absence of conducting particles, compressing the mass into a sheet, passing the said sheet through a high-frequency electrical field until the binder becomes soft and sticky and the cork granules are bound together, and thereafter cooling the same, said high frequency being of the order of 100,000 cycles to 100 megacycles per second.

2. In the process of manufacturing cork inserts for bottle caps and the like, the improvement which comprises mixing cork granules and a substantially non-conducting organic heat convertible thermoplastic adhesive until the said cork is uniformly coated therewith, compressing the mixture into a non-conducting tube and thereafter heating the mixture in the tube by subjecting it to an electrical field having a frequency between about 100,000 cycles and 100 megacycles per second until the said adhesive becomes soft and sticky and is converted and the cork granules are cemented together and thereupon discontinuing the heating.

3. The process of claim 1 in which the binder is a phenol-formaldehyde resin.

4. The process of claim 1 in which the binder is an acrylic acid resin.

5. The process of claim 1 in which the binder is a urea formaldehyde resin.

6. The process of claim 2 in which the non-conducting tube is porous.

7. The process of claim 1 in which the granules and adhesive are subjected to the high frequency field for not more than 5 minutes.

8. The process of claim 2 in which the granules and adhesive are subjected to the high frequency field for not more than 5 minutes.

EARLE C. PITMAN.

CERTIFICATE OF CORRECTION.

Patent No. 2,296,948. September 29, 1942.

EARLE C. PITMAN.

It is hereby certified that error appears in the printed specification of the above numbered patent requiring correction as follows: Page 2, first column, in the footnote to Example 2, lines 3 and 4 thereof, for "the co-pending application of D. J. Loder, Serial No. 593,411" read --U. S. Patent No. 2,111,509 to Loder--; and second column, lines 39 and 40, for "a co-pending application to Arvin Serial No. 651,635" read --U. S. Patent No. 2,060,715--; line 50, after "2,064,802" and before the period insert --may also be employed--; and lines 56 and 57, for "a co-pending application to Arvin, Serial No. 651,635" read --U. S. Patent No. 2,060,715--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.